United States Patent
Aguirre Miranda et al.

(10) Patent No.: US 10,780,925 B2
(45) Date of Patent: Sep. 22, 2020

(54) VEHICLE BODY STRUCTURE

(71) Applicant: Nissan North America, Inc., Franklin, TN (US)

(72) Inventors: Francisco Ruben Aguirre Miranda, Calimaya (MX); Arnold Oswaldo Plata Lopez, Cuidad de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 44 days.

(21) Appl. No.: 16/217,493

(22) Filed: Dec. 12, 2018

(65) Prior Publication Data

US 2020/0189662 A1     Jun. 18, 2020

(51) Int. Cl.
  *B62D 25/02*     (2006.01)
  *B62D 25/04*     (2006.01)
  *B62D 27/02*     (2006.01)

(52) U.S. Cl.
  CPC ............. *B62D 25/02* (2013.01); *B62D 25/04* (2013.01); *B62D 27/023* (2013.01)

(58) Field of Classification Search
  CPC ........ B62D 25/02; B62D 25/04; B62D 27/03; B62D 27/023
  USPC ............ 296/203.01, 203.03, 193.06, 29, 30; 248/224.7, 224.8
  See application file for complete search history.

(56) References Cited

U.S. PATENT DOCUMENTS

| | | | | |
|---|---|---|---|---|
| 4,998,759 | A  * | 3/1991 | Peterson | E05B 85/045 |
| | | | | 292/340 |
| 6,595,579 | B2 * | 7/2003 | Freitag | B62D 25/04 |
| | | | | 296/187.12 |
| 8,272,682 | B2 * | 9/2012 | Cimatti | B62D 25/04 |
| | | | | 296/204 |
| 9,248,862 | B1 | 2/2016 | Redmer et al. | |
| 9,463,829 | B2 * | 10/2016 | Colombo | F16B 5/0657 |
| 9,630,653 | B2 | 4/2017 | Redmer et al. | |
| 9,802,651 | B2 | 10/2017 | Miranda | |
| 10,577,022 | B2 * | 3/2020 | Harrison | B62D 25/04 |
| 2012/0313400 | A1 * | 12/2012 | Balzer | B62D 25/04 |
| | | | | 296/193.06 |
| 2013/0069395 | A1 * | 3/2013 | Nusier | B62D 25/06 |
| | | | | 296/203.03 |
| 2017/0327154 | A1 * | 11/2017 | Harrison | B62D 29/007 |

* cited by examiner

*Primary Examiner* — Dennis H Pedder
(74) *Attorney, Agent, or Firm* — Global IP Counselors, LLP (57) ABSTRACT

A vehicle body structure includes a roof rail structure, a pillar structure, a tube-like reinforcement member and an attachment assembly. The tube-like reinforcement member is shaped to include a first portion, a curved portion and a second portion such that the first portion is fixed within and extends along a portion of the roof rail structure and the second portion extends downward within and extends along an upper portion of the pillar structure. The attachment assembly includes a bracket and a positioning member disposed within the pillar structure. The bracket is fixedly attached to the pillar structure. The second portion of the tube-like reinforcement member extends through an oversized opening in the bracket. The tube-like reinforcement member is fixedly attached to the positioning member and the positioning member being fixedly attached to the bracket.

19 Claims, 11 Drawing Sheets

VEHICLE BODY STRUCTURE

BACKGROUND

Field of the Invention

The present invention generally relates to a vehicle body structure. More specifically, the present invention relates to a vehicle body structure with roof rail structure and a rear pillar structure having a reinforcement member that extends along a portion of the roof rail structure, curves downward and extends along the rear pillar between inner and outer panels that define the roof rail structure and the rear pillar structure.

Background Information

A vehicle body structure includes roof rail assemblies and pillar assemblies where a plurality of panels that define the roof rail assemblies and the pillar assemblies.

SUMMARY

One object of the invention is to provide a pillar structure with a reinforcement member that strengthens a roof rail structure and a pillar structure.

In view of the state of the known technology, one aspect of the present disclosure is to provide a vehicle body structure with a roof rail structure, a pillar structure, a tube-like reinforcement member and an attachment assembly. The tube-like reinforcement member is shaped to include a first portion, a curved portion and a second portion. The first portion is fixed within and extends along a portion of the roof rail structure. The second portion extends downward within and extends along an upper portion of the pillar structure. The attachment assembly includes a bracket and a positioning member disposed within the pillar structure. The bracket is fixedly attached to the pillar structure. The second portion of the tube-like reinforcement member extends through an oversized opening in the bracket. The tube-like reinforcement member is fixedly attached to the positioning member and the positioning member being fixedly attached to the bracket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
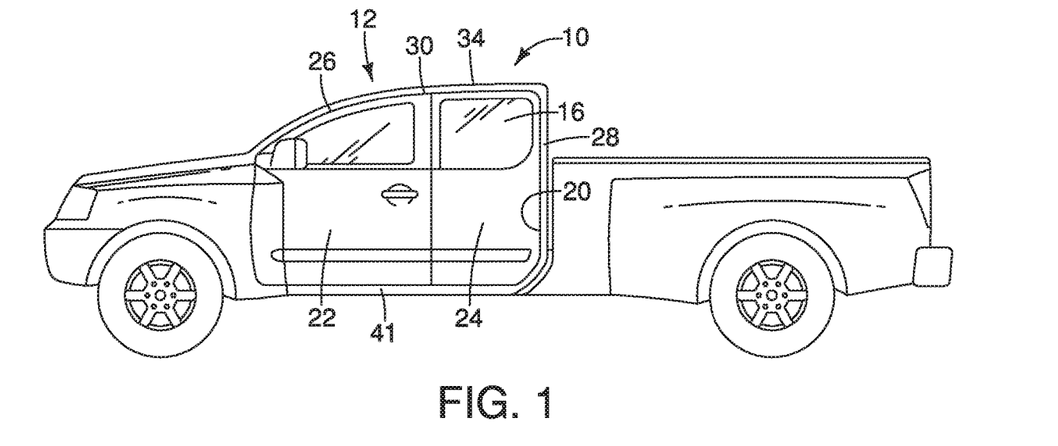
FIG. 1 is a side view of a vehicle that showing a vehicle body structure with a roof rail structure and a rear pillar structure that at least partially defines a door opening, with doors within the door opening being in a closed orientation in accordance with an exemplary embodiment.

Referring initially to FIG. 1, a vehicle 10 that includes a vehicle body structure 12 with a reinforcement member 14 (shown in FIGS. 2-14 and 16-20) is illustrated in accordance with an exemplary embodiment.

In FIG. 1, the vehicle 10 is depicted as a pickup truck. However, it should be understood from the drawings and the description herein that the vehicle 10 can be any of a variety of vehicle designs and that use of the reinforcement member 14 is not limited to use with a pickup truck vehicle design.

Figure 2:
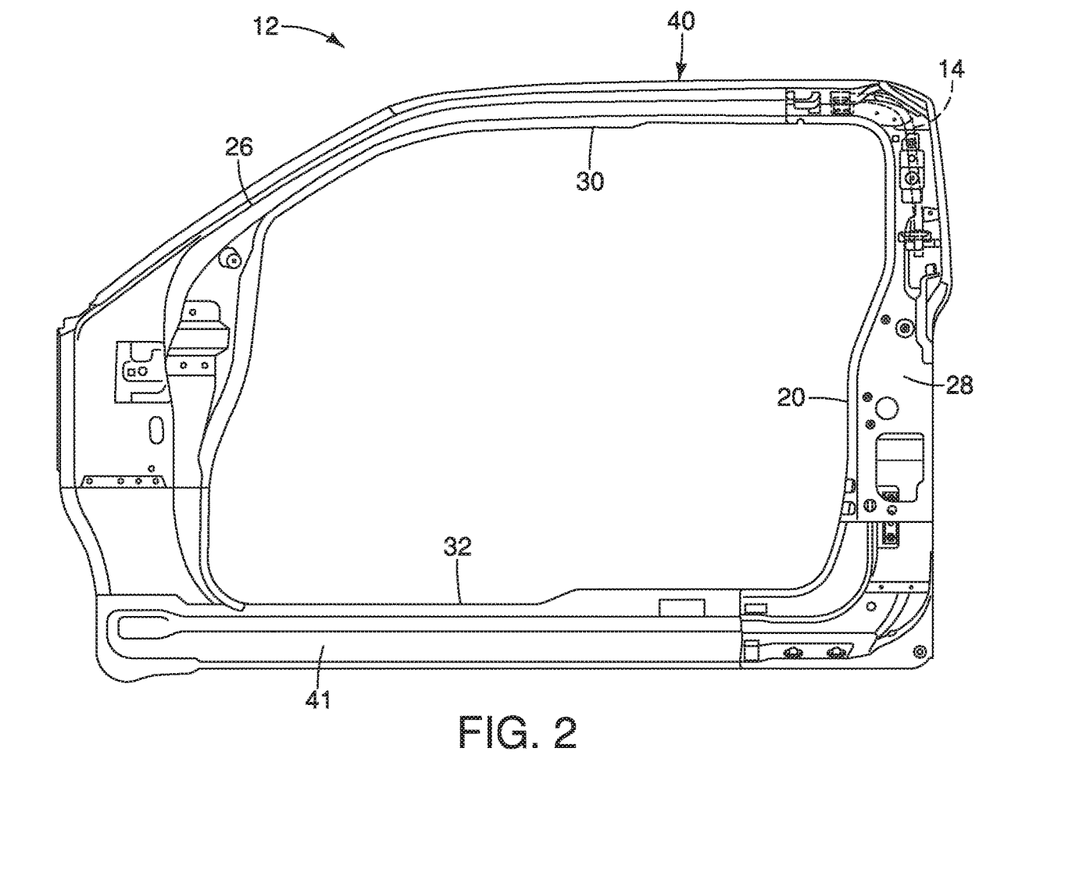
FIG. 2 is a side view of a side panel assembly removed from a remainder of the vehicle body structure showing a roof rail structure and a rear pillar structure in accordance with the exemplary embodiment.

The vehicle body structure 12 of the vehicle 10 includes a passenger compartment 16 that is often referred to as a King Cab or Crew Cab that includes both front seats (not shown) and rear seats (not shown). Further as shown in FIG. 1, the vehicle body structure 12 includes a single door opening 20 on each side of the vehicle 10, with a front door 22 and a rear door 24. FIG. 1 shows both the front door 22 and the rear door 24 in respective closed positions. FIG. 2 shows the front door 22 and the rear door 24 removed to show further details of the vehicle body structure 12.

The vehicle body structure 12 is formed from a plurality of panels that are welded or otherwise rigidly and non-movably fixed to one another to define the passenger compartment 16. In the depicted embodiment, the vehicle body structure 12 includes, among other features, A-pillar assemblies 26, rear pillar structures 28 (a C-pillar), roof rail structures 30, a floor 32 and a roof 34. The A-pillar 26 defines a front edge of the door opening 20, the roof rail structures 30 define an upper edge of the door opening 20, and the rear pillar structure 28 defines a rear edge of the door opening 20. There are two rear pillar structures 28 in the vehicle body structure 12. The rear pillar structures 28 are basically the same with the exception of being approximate symmetrical mirror images of one another. Therefore, in the description below, only one of the rear pillar structures 28 is described for the sake of brevity but applies equally to both.

The rear pillar structures 28 and the roof rail structures 30 define respective rear corners of the passenger compartment 16.

The vehicle body structure 12 can further be divided into a plurality of different sections. For the sake of understanding the overall arrangement of the vehicle body structure 12, description of a side panel assembly 40 of the vehicle body structure 12 is provided with initial reference to FIGS. 2 and 3.

Figure 3:
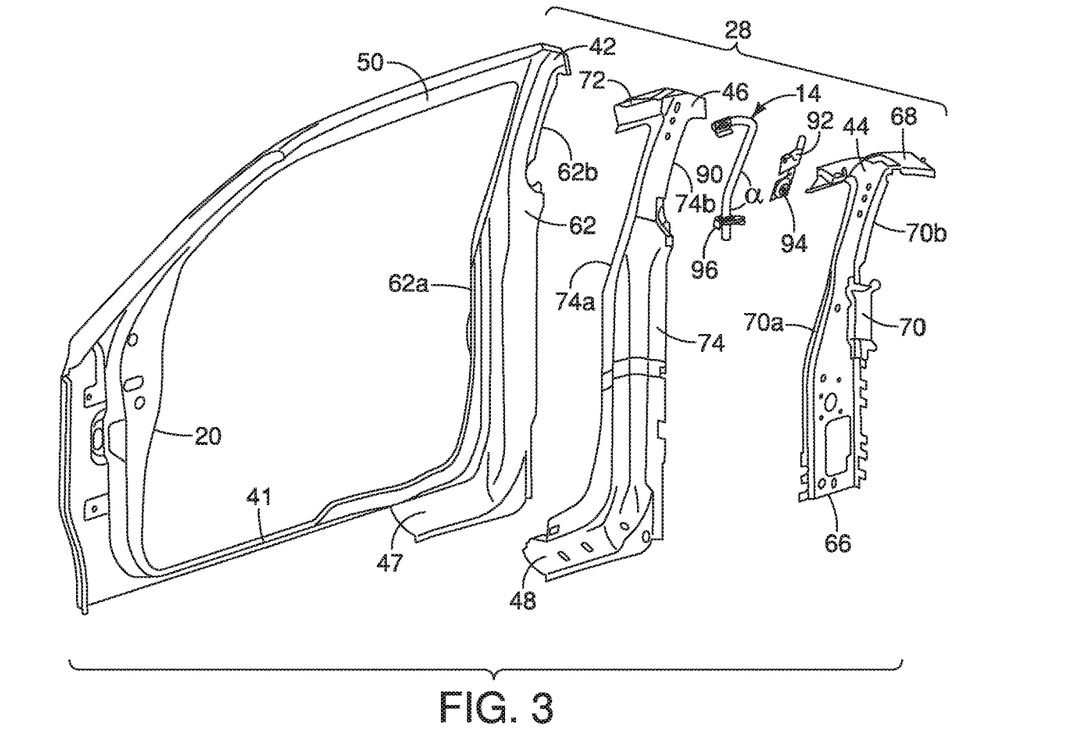
FIG. 3 is an exploded view of the rear pillar structure of the side panel assembly showing elements of the rear pillar structure including an outer body panel, an inner body panel, a central panel and a reinforcement member in accordance with the exemplary embodiment.
Figure 4:
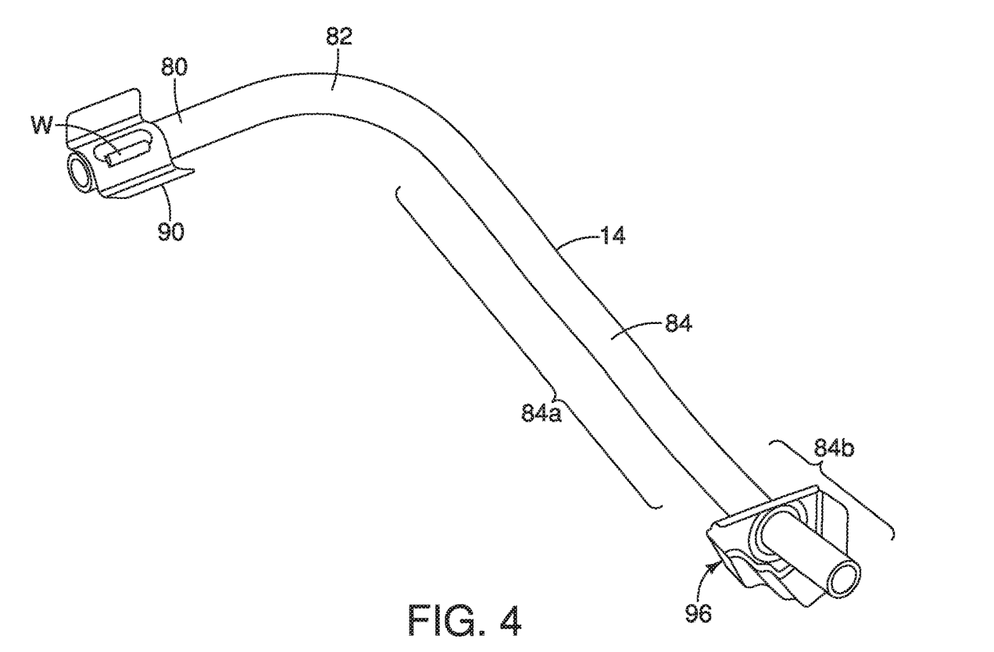
FIG. 4 is a perspective view of the reinforcement member removed from the rear pillar structure, showing a first portion, a curved portion and a second portion of the reinforcement member, along with an upper bracket fixed to the first portion and an attachment assembly that attaches to the second portion of the reinforcement member, in accordance with the exemplary embodiment.

As shown in FIGS. 2 and 3 with the doors 22 and 24 and all trim panels removed, the side panel assembly 40 includes the A-pillar assembly 26, the rear pillar structure 28, a sill portion 41 and the roof rail assembly 30. The A-pillar assembly 26, the rear pillar structure 28, the sill portion 41 and the roof rail assembly 30 surround and define the single door opening 20. The sill portion 41 attaches to the floor 32 and basically defines a floor supporting portion of the side panel assembly 40.

As shown in FIG. 3, the rear pillar structure 28 includes a plurality of panels welded together: an outer body panel 42, an inner body panel 44 and a central panel 46, and further includes the reinforcement member 14. The outer body panel 42 and the central panel 46 includes floor supporting portions 47 and 48, respectively. The outer panel 42 further includes a roof rail portion 50 and a pillar portion 62. The pillar portion 62 extends from the floor supporting portions 48 to the roof rail portion 50. The pillar portion 62 has a front edge 62a that at least partially defines the door opening 20 and an upper rear edge 62b that at least partially defines a rear window opening.

As is also shown in FIG. 3, the inner body panel 44 includes a lower portion 66, a roof rail portion 68 and a pillar portion 70. The pillar portion 70 extends from the lower portion 66 to the roof rail portion 68. The central panel 46 includes the floor supporting portion 48, a roof rail portion 72 and a pillar portion 74 that extends from the floor supporting portion 48 and the roof rail portion 72.

The pillar portion 70 has a front edge 70a that at least partially defines the door opening 20 along with the front edge 62a of the outer body panel 42, and a rear edge 70b that at least partially defines the rear window opening along with the rear edge 70b of the outer body panel 42.

The pillar portion 74 of the central panel 46 has a front edge 74a that at least partially defines the door opening 20 and a rear edge 74b that at least partially defines the rear window opening.

The front edge 62a of the pillar portion 62 of the outer body panel 42, and the front edge 74a of the pillar portion 74 are welded to one another in a conventional manner. The front edge 70a of the pillar portion 70 of the inner body panel 44 is further welded to the front edge 62a and the front edge 74a in a conventional manner. The reinforcement member 14 is installed to an inboard side of the pillar portion 74 of the central panel 46, as is described in greater detail below. Further, the rear edge 62b of the pillar portion 62 of the outer body panel 42 and the rear edge 74b of the pillar portion 74 of the central panel 46 are welded to one another in a conventional manner.

The rear edge 70b of the pillar portion 70 of the inner body panel 44 is further welded to the rear edge 62b and the rear edge 74b in a conventional manner but is not welded in place until after the reinforcement member 14 has installed to the pillar portion 74 of the central panel 46, as is described in greater detail below.

Figure 5:
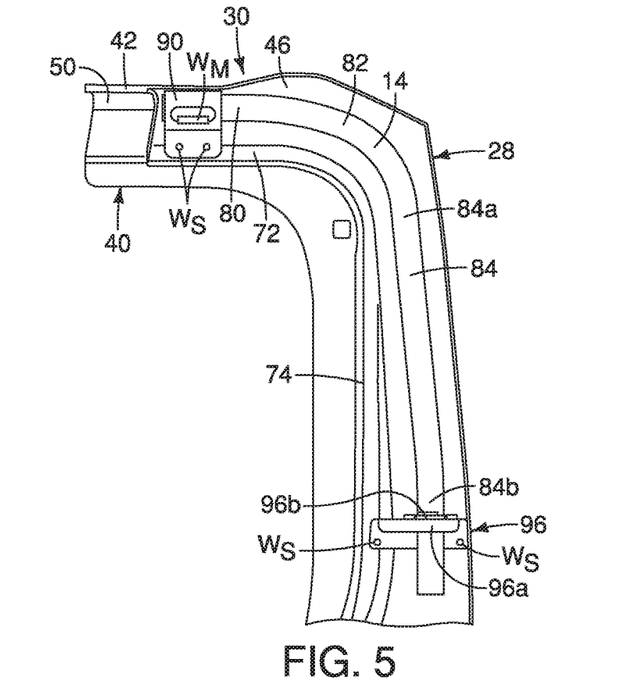
FIG. 5 is a plan view of an upper rear corner of the side panel assembly showing the reinforcement member, the upper bracket and the attachment assembly installed within the rear pillar structure, in accordance with the exemplary embodiment.
Figure 6:
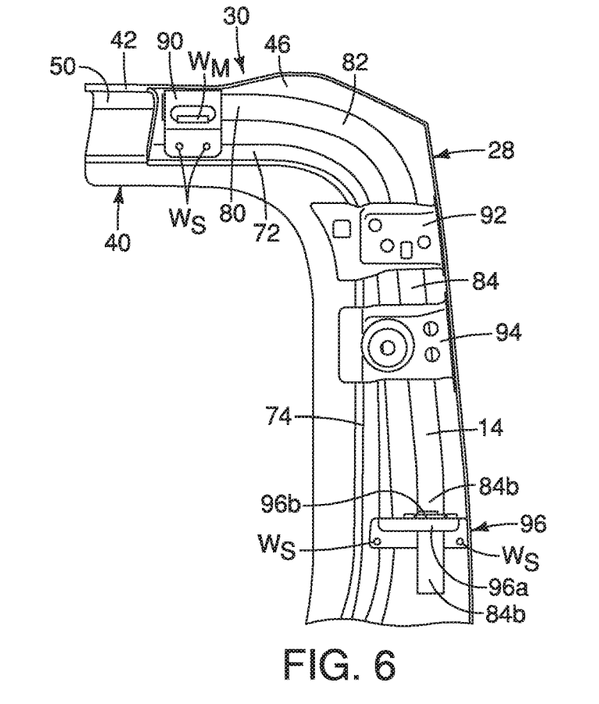
FIG. 6 is another plan view of the upper rear corner of the side panel assembly showing the reinforcement member, the upper bracket and the attachment assembly installed within the rear pillar structure, with first and second seatbelt brackets overlaying portions of the reinforcement member, in accordance with the exemplary embodiment.
Figure 7:
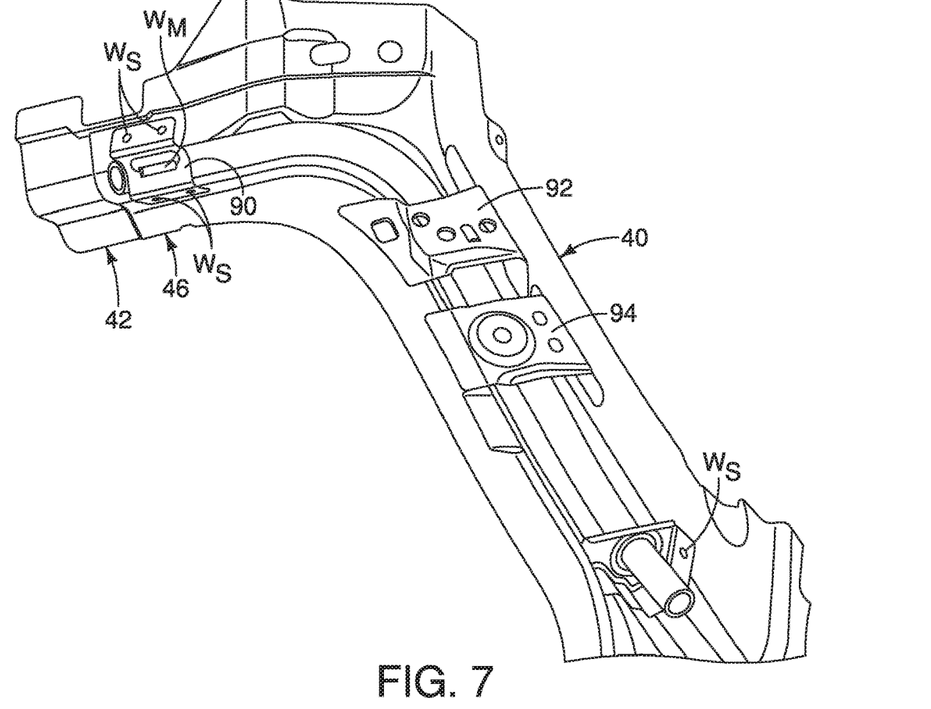
FIG. 7 is a perspective view of the upper rear corner of the side panel assembly showing the reinforcement member, the upper bracket and the attachment assembly installed within the rear pillar structure, with first and second seatbelt brackets overlaying the portions of the reinforcement member, in accordance with the exemplary embodiment.

As is shown in FIGS. 5-7, the reinforcement member 14 is located in an upper portion of the rear pillar structure 28 between the central panel 46 and the inner body panel 44.

As shown in FIGS. 5-7, the outer body panel 42, the central panel 46 and the reinforcement member 14 are shown with the inner body panel 44 removed to show the reinforcement member 14 installation within the side panel assembly 40.

As shown in FIG. 3 removed from the vehicle body structure 12, the reinforcement member 14 is a tube-like element that includes a first portion 80, a curved portion 82, and, a second portion 84. More specifically, in the depicted embodiment, the reinforcement member 14 resembles a pipe that has been bent into the shape shown in FIG. 3. The reinforcement member 14 (also referred to as a tube-like reinforcement member) can be formed using any of a variety of tube or pipe shaping techniques, including heating and gradually bending a pipe to form the first portion 80, the curved portion 82, and, the second portion 84.

Figure 17:
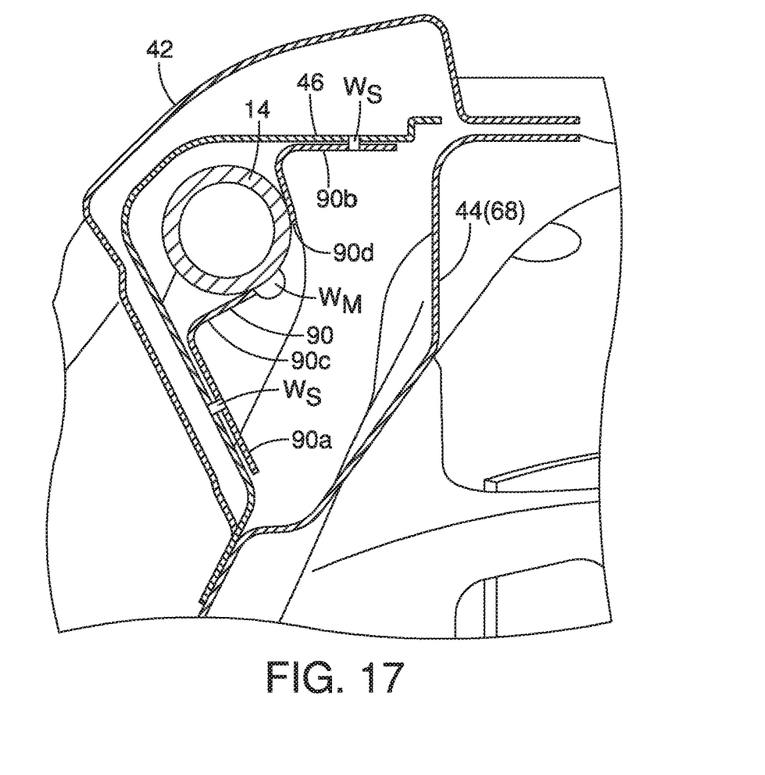
FIG. 17 is a cross-sectional view of the roof rail structure taken along the line 17-17 in FIG. 15 in accordance with the exemplary embodiment.
Figure 18:
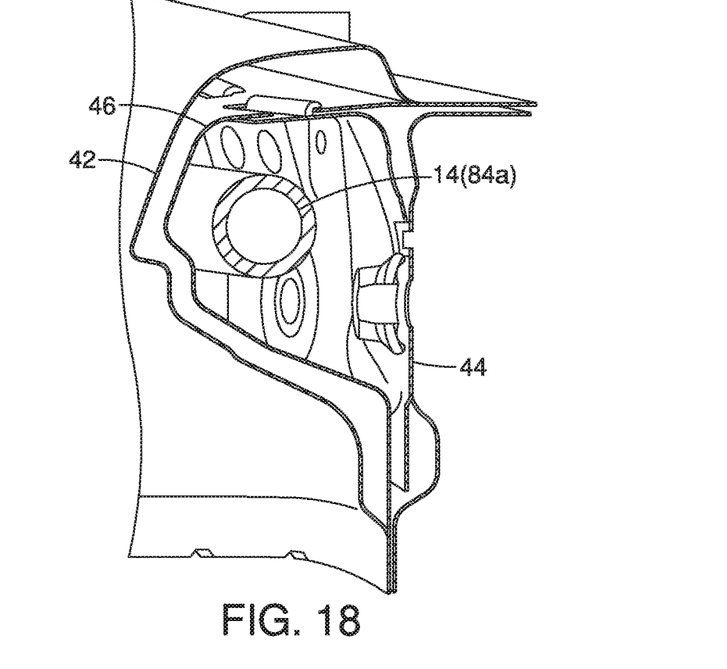
FIG. 18 is a cross-sectional view of an upper portion of the rear pillar structure taken along the line 18-18 in FIG. 15 in accordance with the exemplary embodiment.
Figure 19:
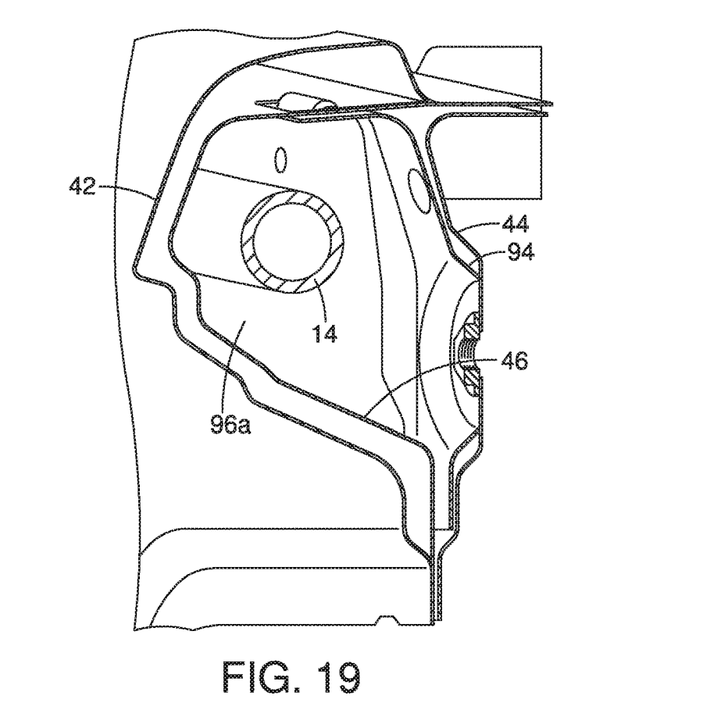
FIG. 19 is another cross-sectional view of a portion of the rear pillar structure taken along the line 19-19 in FIG. 15 in accordance with the exemplary embodiment.
Figure 20:
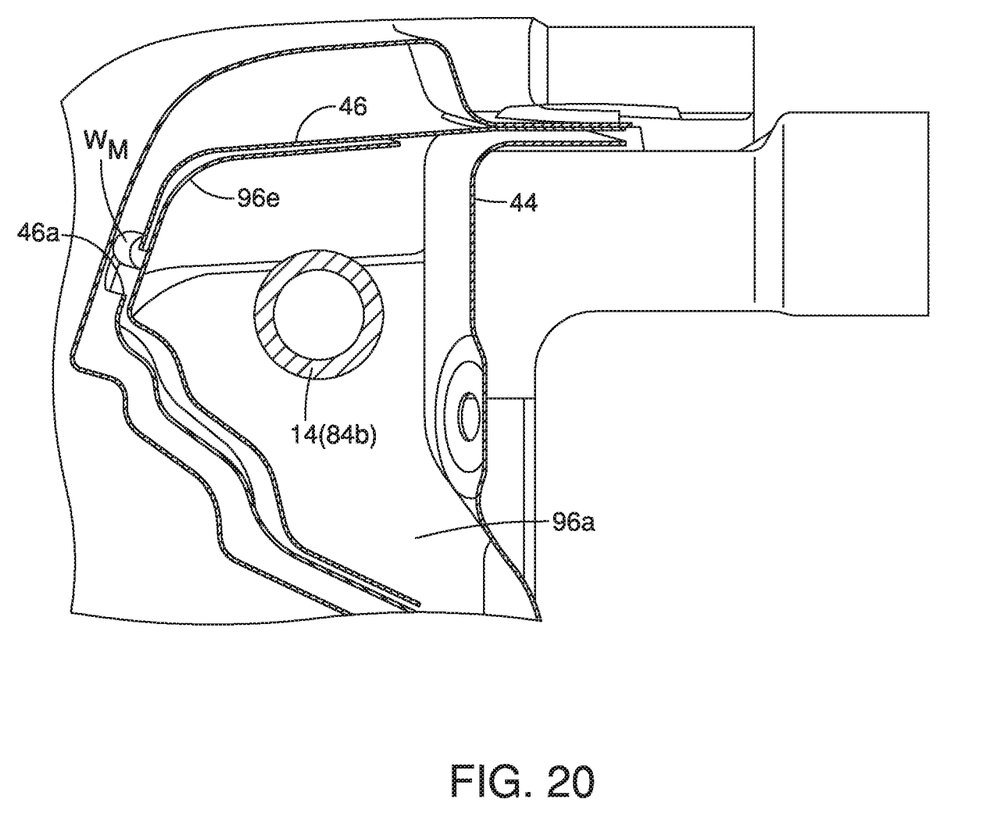
FIG. 20 is still another cross-sectional view of another portion of the rear pillar structure taken along the line 20-20 in FIG. 15 in accordance with the exemplary embodiment.

The first portion 80 is generally straight, having an overall cylindrical or annular shape, as viewed in cross-section in FIG. 17. The curved portion 82 is shaped to define a curved corner that joins the first portion 80 to the second portion 84 such that the first portion 80 and at least an upper portion 84a of the second portion 84 extend in directions that are approximately perpendicular. The upper portion 84a of the second portion 84 has an overall straight cylindrical shape or annular shape, as viewed in cross-section in FIG. 18. A lower end 84b of the second portion 84 curves slightly inboard from the upper portion 84a defining an angle α that is between 150 and 170 degrees, as shown in FIG. 3. The specific value of the angle α depends upon the overall shape of the rear pillar assembly 28 and varies from vehicle design to vehicle design. In the depicted embodiment the angle α is approximately 165 degrees. Throughout its overall length, the reinforcement member 14 has an annular shape or cylindrical shape, as viewed in cross-section, as shown in FIGS. 17-20.

As shown in FIGS. 5-7, the first portion 80 of the reinforcement member 14 is fixed to and is located within a rearward section of the roof rail structure 30. The curved portion 82 extends from the roof rail structure 30 and into the rear pillar assembly 28. The second portion 84 extends downward within and extends along an upper portion of the rear pillar structure 28.

Figure 8:
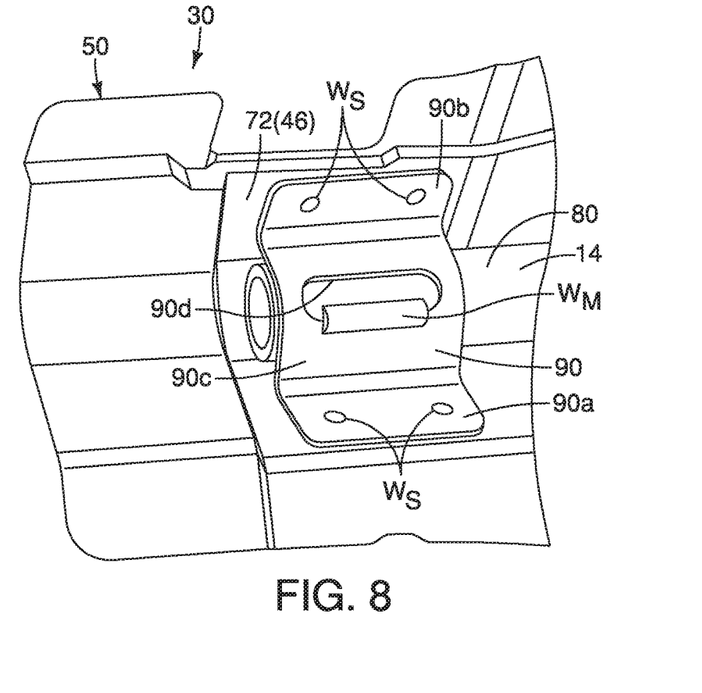
FIG. 8 is a perspective view of a portion of the roof rail structure showing the reinforcement member and the upper bracket to the roof rail structure installed to the roof rail structure, in accordance with the exemplary embodiment.

The reinforcement member 14 is fixed in position within the roof rail structure 30 and the rear pillar assembly 28 via an upper bracket 90. As shown in FIGS. 8 and 17, the upper bracket has a first flange 90a and a second flange 90b that extend from lower and upper edges of a curved section 90c. The curved section 90c defines an opening or slot 90d that is dimensioned such that the curved section 90c is welded to the reinforcement member 14 forming a weld WM through the slot 90d. The weld WM can be formed using any of a variety of techniques, such as MIG welding techniques. The first flange 90a and the second flange 90b are further welded to the roof rail portion 72 of the central panel 46 of the roof rail structures 30 of the side panel assembly 40 using, for example, spot welding techniques to form a series of spot welds Ws.

A first seatbelt bracket 92 and a second seatbelt bracket 94 overlay portions of the upper portion 84a, but do not necessarily attached to the reinforcement member 14. However, it is possible to weld the first seatbelt bracket 92 and the second seatbelt bracket 94 to the reinforcement member 14, if desired or deemed advantageous. The first seatbelt bracket 92 and a second seatbelt bracket 94 are welded in position after the reinforcement member 14 is installed.

Figure 9:
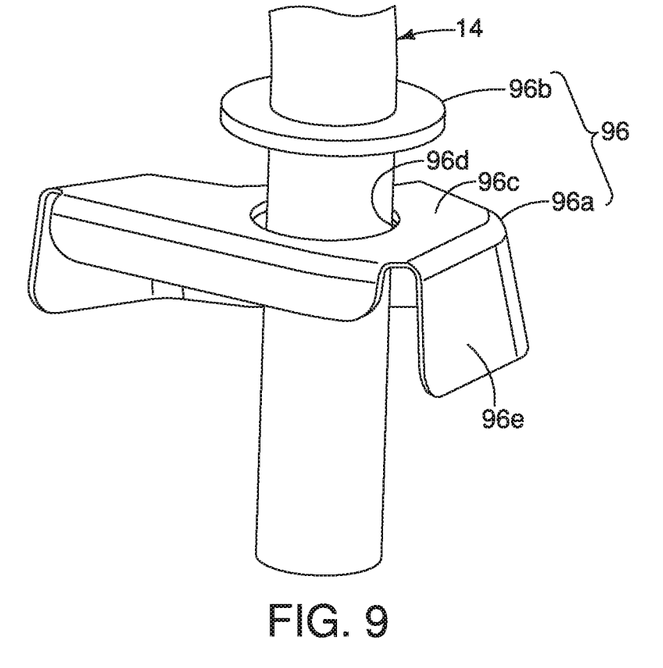
FIG. 9 is a partially exploded perspective view of the reinforcement member and the attachment assembly showing a bracket and a positioning member of the attachment assembly prior to installation in accordance with the exemplary embodiment.
Figure 10:
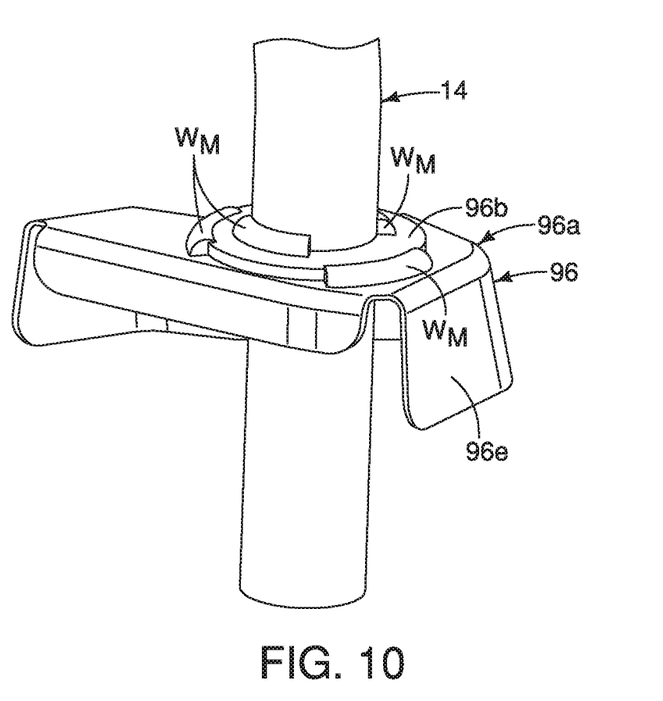
FIG. 10 is a perspective view of the reinforcement member and the attachment assembly, similar to FIG. 9, showing the positioning member welded to the bracket and the reinforcement member in accordance with the exemplary embodiment.
Figure 11:
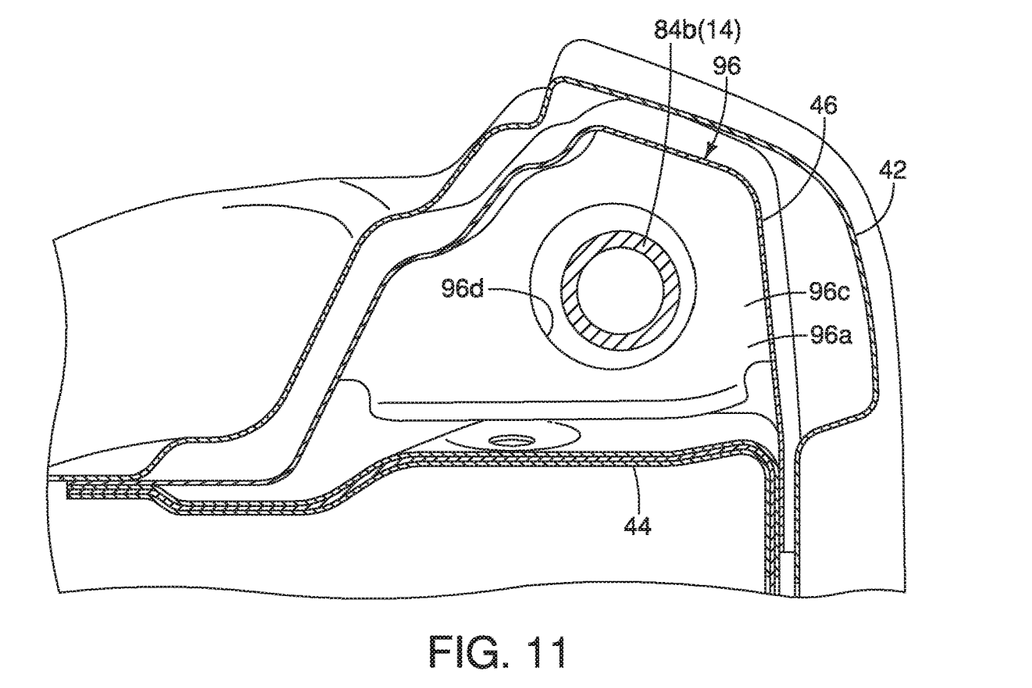
FIG. 11 is a cross-sectional view of the rear pillar structure taken from just above the attachment assembly, showing the reinforcement member extending through an oversized opening in the bracket, with the positioning member removed, in accordance with the exemplary embodiment.
Figure 12:
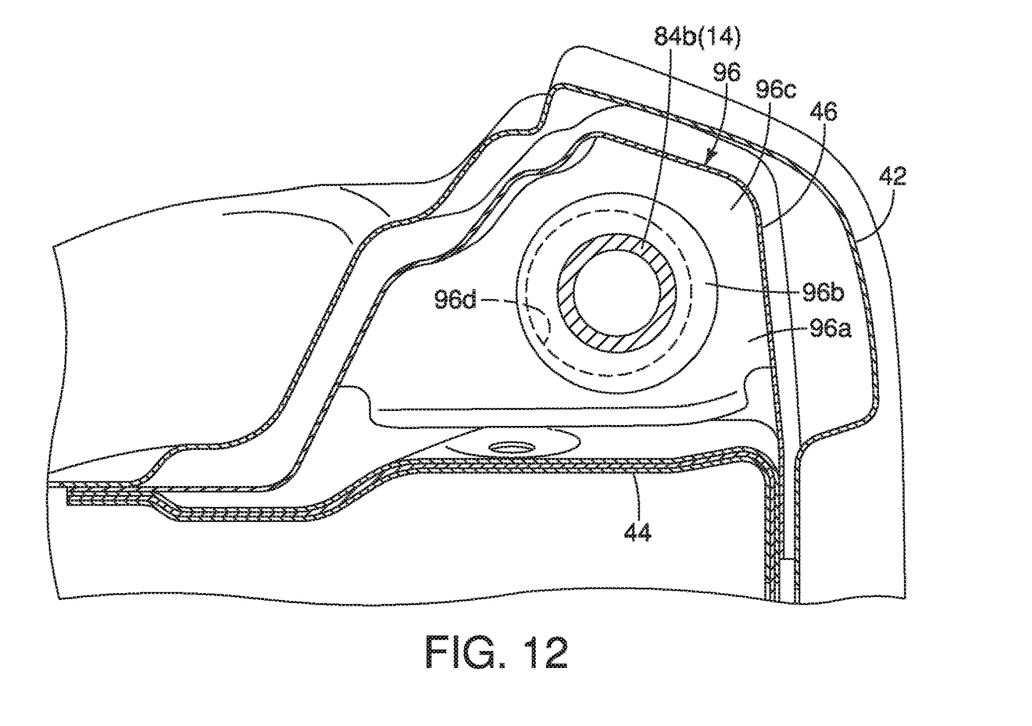
FIG. 12 is another cross-sectional view of the rear pillar structure similar to FIG. 11, showing the reinforcement member extending through the oversized opening in the bracket, with the positioning member overlaying the oversized opening and a portion of an upper surface of the bracket, in accordance with the exemplary embodiment.

The reinforcement member 14 is fixed in position within the rear pillar assembly 28 via an attachment assembly 96. As shown in FIGS. 9 and 10, the attachment assembly 96 includes a bracket 96a and a positioning member 96b disposed within the rear pillar structure 28. The bracket 96a includes a main section 96c with an oversized opening 96d (oversized relative to an outer diameter of the reinforcement member 14), as shown in FIGS. 11 and 12. The bracket 96a also includes a horseshoe shaped flange 96e that extends partway around the main section 96c, as shown in FIGS. 9-10 and 13-14.

Figure 13:
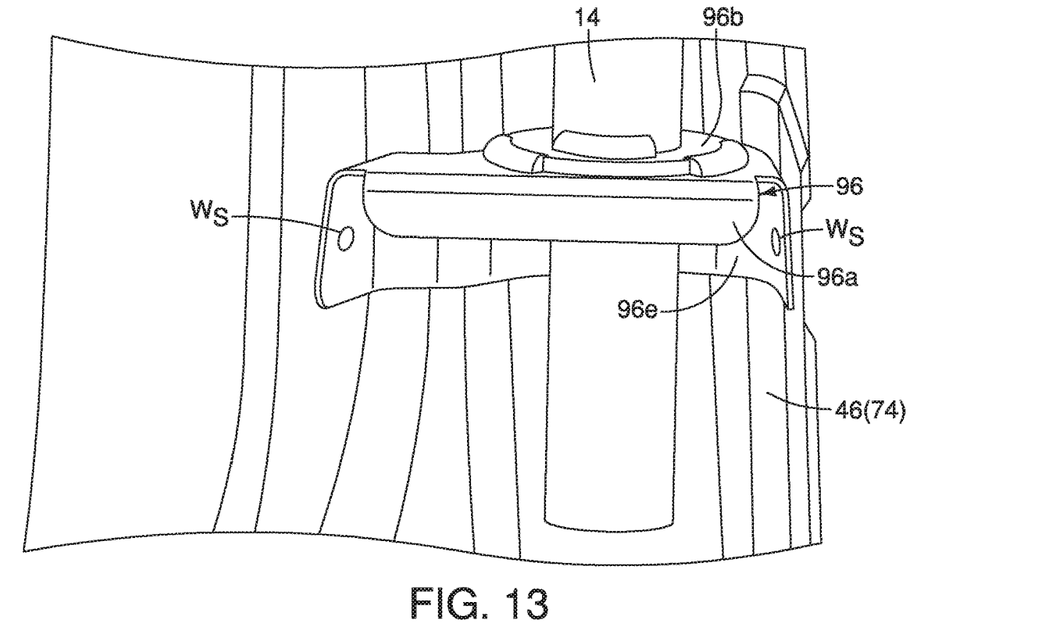
FIG. 13 is a perspective view of a portion of the rear pillar structure with the inner body panel removed showing the bracket and the positioning member installed to the rear pillar structure in accordance with the exemplary embodiment.
Figure 14:
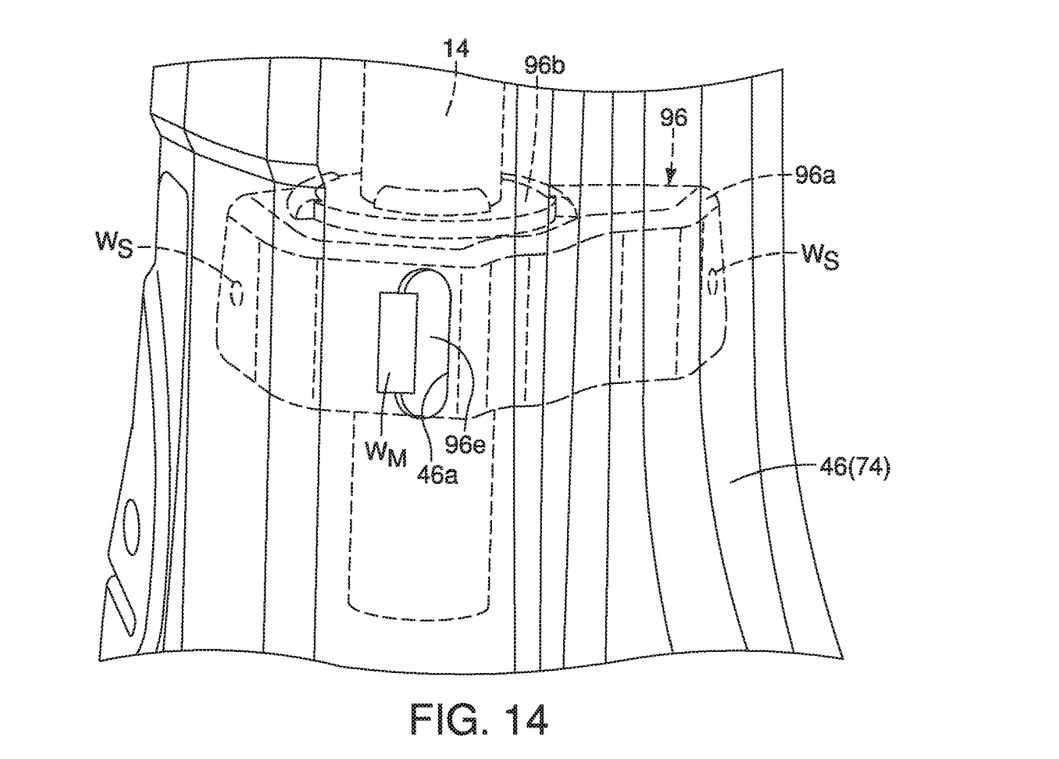
FIG. 14 is another perspective view of the portion of the rear pillar structure depicted in FIG. 13, from an outboard side thereof, showing the bracket welded to the central panel of the rear pillar structure in accordance with the exemplary embodiment.
Figure 15:
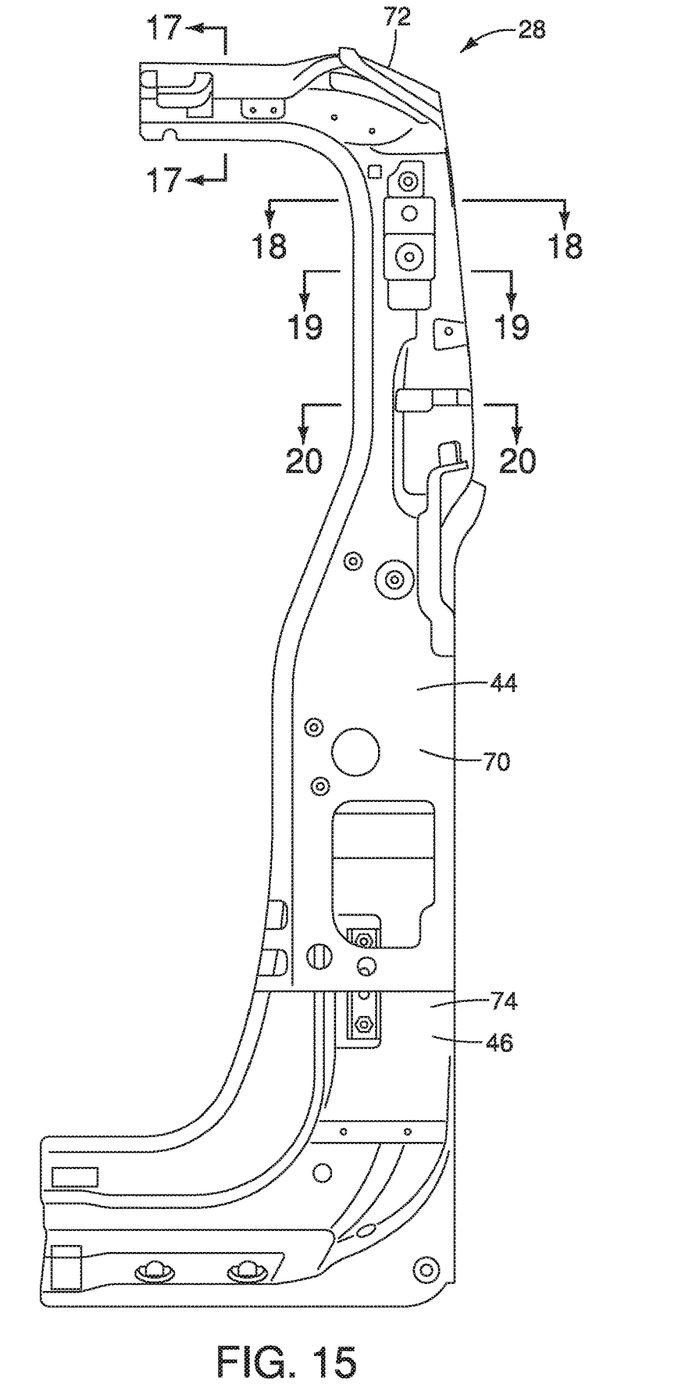
FIG. 15 is a plan view of the rear pillar structure indicating various numbered lines corresponding the cross-sectional view in accordance with the exemplary embodiment.
Figure 16:
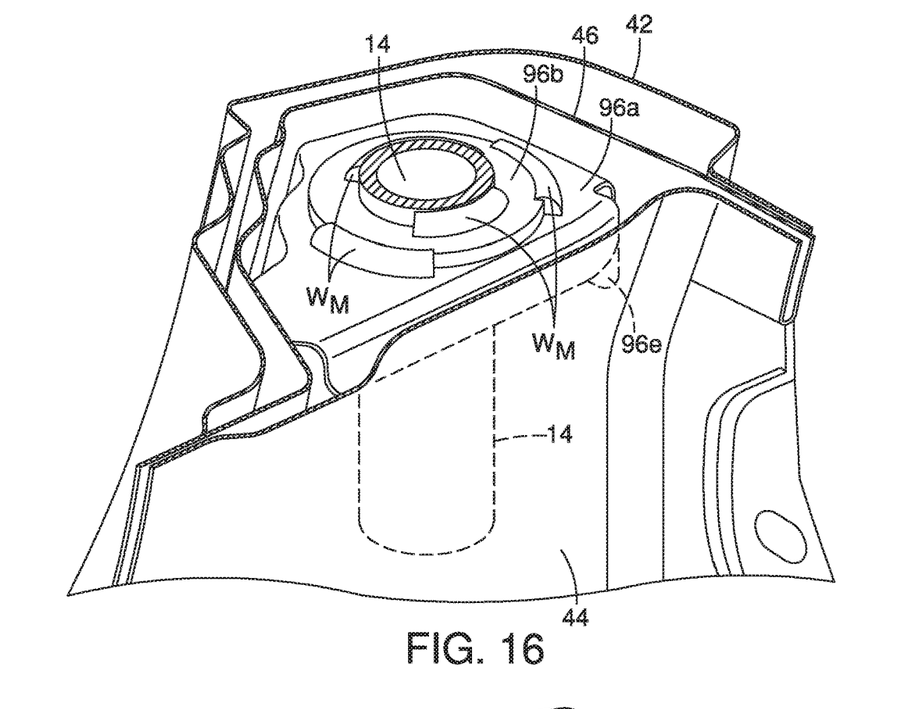
FIG. 16 is another perspective view of the portion of the rear pillar structure showing the bracket and the positioning member installed to the rear pillar structure retaining the reinforcement member in position in accordance with the exemplary embodiment.

During installation, the horseshoe shaped flange 96e of the bracket 96a is fixedly attached to an interior surface of the pillar portion 74 of the central panel 46 of the rear pillar structure 28, via welding techniques to form spot welds Ws, as shown in FIGS. 13 and 14. Further, the pillar portion 74 of the central panel 46 defines an opening or slot 46a, as shown in FIG. 14. Another weld WM is formed through the opening or slot 46a fixing the horseshoe shaped flange 96e to the pillar portion 74. Thus, the bracket 96a is fixed to the rear pillar assembly 28 at a plurality of weld locations.

As shown in FIGS. 11 and 12, the second portion 84 of the (tube-like) reinforcement member 14 extends through an oversized opening 96d in the bracket 96, and further extends through the positioning member 96b. As is explained in greater detail below, once the reinforcement member 14 is fully fitted in position, the bracket 96a is welded within the rear pillar structure 28. Thereafter, the positioning member 96b is welded to the reinforcement member 14, and, the positioning member 96b is welded to the bracket 96a.

During installation, the upper bracket 90 is attached to the roof rail structure 30, as is described above, with the inner body panel 44 not yet installed. Thereafter, the attachment assembly 96 is installed to the rear pillar structure 28. The attachment assembly 96 is configured such that during installation of the (tube-like) reinforcement member 14, the bracket 96a is welded to an interior surface of the pillar structure 28 (with the inner body panel 44 not yet installed. The second portion 84 of the reinforcement member 14 extends through the oversized opening 96d in the bracket 96a as the bracket 96a is welded in position. Due to engineering tolerances, the reinforcement member 14 need not be concentrically arranged relative to the oversized opening 96d, but is preferably concentric. As shown in FIGS. 11 and 12, the reinforcement member 14 can have a non-concentric relationship relative to the oversized opening 96d. Specifically, the lower portion 84b of the reinforcement member 14 is likely in a non-concentric orientation relative to the oversized opening 96d. However, positioning member 96b is configured such that the reinforcement member 14 undergoes little lateral movement relative to the positioning member 96b. More specifically, the opening of the positioning member 96b is only slightly larger than the reinforcement member 14 such that the positioning member 96b can be slid onto the reinforcement member 14. Initially, the positioning member 96b is loosely laid over the bracket 96a and rests thereon. The positioning member 96b is dimensioned such that the positioning member 96b completely covers the oversized opening 96d regardless of the location of the reinforcement member 14 within the oversized opening 96d, as shown in FIG. 12. Once the positioning member 96b overlays the oversized opening 96d, the positioning member 96b is welded to the upper surface of the bracket 96a and the reinforcement member 14, thereby fixing the reinforcement member 14 in position.

The various vehicle elements and components, other than the reinforcement member 14 and related structures, are conventional components that are well known in the art. Since vehicle elements and components are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   a roof rail structure;
   a pillar structure that at least partially defines a rear upper corner of a passenger compartment of a vehicle;
   a tube-like reinforcement member shaped to include a first portion, a curved portion and a second portion such that the first portion is fixed within and extends along a portion of the roof rail structure and the second portion extends downward within and extends along an upper portion of the pillar structure; and
   an attachment assembly including a bracket and a positioning member disposed within the pillar structure, the bracket being fixedly attached to the pillar structure, the second portion of the tube-like reinforcement member extending through an oversized opening in the bracket, with the tube-like reinforcement member being fixedly attached to the positioning member and the positioning member being fixedly attached to the bracket.

2. The vehicle body structure according to claim 1, wherein
   the second portion of the tube-like reinforcement member is welded to the positioning member and the positioning member is welded to the bracket.

3. The vehicle body structure according to claim 1, wherein
   the tube-like reinforcement member has an annular shape as viewed in cross-section throughout its overall length.

4. The vehicle body structure according to claim 1, wherein
   the tube-like reinforcement member is a pipe with a hollow interior bent to form the first portion, the curved portion and the second portion.

5. The vehicle body structure according to claim 1, wherein
   the first portion of the tube-like reinforcement member is fixedly attached to an interior surface of the roof rail structure by a first attachment bracket.

6. The vehicle body structure according to claim 1, wherein
   the attachment assembly fixedly attaches a lower end part of the second portion of the tube-like reinforcement member to the pillar structure.

7. The vehicle body structure according to claim 6, further comprises
   a second attachment bracket that fixedly attaches an upper end part of the second portion of the tube-like reinforcement member to the pillar structure.

8. The vehicle body structure according to claim 7, further comprises
   a third attachment bracket that fixedly attaches the second portion of the tube-like reinforcement member to the pillar structure at a location vertically between the second attachment bracket and the attachment assembly.

9. The vehicle body structure according to claim 1, wherein
   the roof rail structure and the pillar structure at least partially define the rear upper corner of the passenger compartment of the vehicle.

10. The vehicle body structure according to claim 9, wherein
    the roof rail structure and the pillar structure further define a door opening that provides access to the passenger compartment of the vehicle.

11. A vehicle body structure, comprising:
    a roof rail structure;
    a pillar structure;
    a tube-like reinforcement member shaped to include a first portion, a curved portion and a second portion such that the first portion is fixed within and extends along a portion of the roof rail structure and the second portion extends downward within and extends along an upper portion of the pillar structure; and
    an attachment assembly including a bracket and a positioning member disposed within the pillar structure, the bracket being fixedly attached to the pillar structure, the second portion of the tube-like reinforcement member extending through an oversized opening in the bracket, with the tube-like reinforcement member being fixedly attached to the positioning member and the positioning member being fixedly attached to the bracket,
    wherein
    the attachment assembly is configured such that during installation of the tube-like reinforcement member, the bracket is welded to an interior surface of the pillar structure, the second portion of the tube-like reinforcement member can extend through the oversized opening in the bracket in a non-concentric orientation, the tube-like reinforcement member further extends through a central opening in the positioning member, the positioning member loosely laid over the bracket with the positioning member being dimensioned such that the positioning member completely covers the oversized opening prior to fixedly attaching the positioning member to the bracket and prior to fixedly attaching the positioning member to the tube-like reinforcement member.

12. The vehicle body structure according to claim 11, wherein
the second portion of the tube-like reinforcement member is welded to the positioning member and the positioning member is welded to the bracket.

13. The vehicle body structure according to claim 11, wherein
the first portion of the tube-like reinforcement member is fixedly attached to an interior surface of the roof rail structure by a first attachment bracket.

14. The vehicle body structure according to claim 13, wherein
the attachment assembly fixedly attaches a lower end part of the second portion of the tube-like reinforcement member to the pillar structure.

15. A vehicle body structure, comprising:
a roof rail structure;
a pillar structure;
a tube-like reinforcement member shaped to include a first portion, a curved portion and a second portion such that the first portion is fixed within and extends along a portion of the roof rail structure and the second portion extends downward within and extends along an upper portion of the pillar structure;
at least one seatbelt bracket fixedly attached to the pillar structure such that the at least one seatbelt bracket overlays a portion of the second portion of the tube-like reinforcement member; and
an attachment assembly including a bracket and a positioning member disposed within the pillar structure, the bracket being fixedly attached to the pillar structure, the second portion of the tube-like reinforcement member extending through an oversized opening in the bracket, with the tube-like reinforcement member being fixedly attached to the positioning member and the positioning member being fixedly attached to the bracket.

16. The vehicle body structure according to claim 15, wherein
the at least one seatbelt bracket includes a first seatbelt bracket and a second seatbelt bracket with both the first seatbelt bracket and the second seatbelt bracket overlaying respective portions of the second portion of the tube-like reinforcement member.

17. The vehicle body structure according to claim 16, wherein
the bracket and the positioning member of the attachment assembly are positioned below the first seatbelt bracket and the second seatbelt bracket.

18. The vehicle body structure according to claim 15, wherein
the pillar structure includes a front edge that at least partially defines a door opening and a rear edge that at least partially defines a rear window opening.

19. The vehicle body structure according to claim 15, wherein
the first portion and the second portion of the tube-like reinforcement member extend in directions that are approximately perpendicular to one another.

* * * * *